United States Patent [19]

Das et al.

[11] Patent Number: 5,445,850
[45] Date of Patent: Aug. 29, 1995

[54] AMINOPLAST CURED ACID ETCH RESISTANT COATING WITH GOOD DURABILITY

[75] Inventors: Suryya K. Das, Pittsburgh; Soner Kilic, Gibsonia; Michael A. Mayo, Pittsburgh; Andrew J. Lauer, Lower Burrell, all of Pa.

[73] Assignee: PPG Industries, Inc., Pittsburgh, Pa.

[21] Appl. No.: 198,718

[22] Filed: Feb. 18, 1994

[51] Int. Cl.$^6$ .......................... B05D 7/16; B05D 1/36
[52] U.S. Cl. ................................ 427/407.1; 427/409
[58] Field of Search .................. 427/407.1, 388.3, 409

[56] References Cited

U.S. PATENT DOCUMENTS

| | | | |
|---|---|---|---|
| 3,639,147 | 2/1972 | Benefiel et al. | 427/409 |
| 3,867,347 | 2/1975 | Felber et al. | 260/63 UY |
| 4,297,448 | 10/1981 | Chang et al. | 427/409 |
| 4,345,057 | 8/1982 | Yamabe et al. | 526/247 |
| 4,359,504 | 11/1982 | Troy | 427/405 |
| 4,360,644 | 11/1982 | Briggs et al. | 427/409 |
| 4,361,594 | 11/1982 | Winterbottom | 427/388.3 |
| 4,404,248 | 9/1983 | Spinelli et al. | 427/388.3 |
| 4,411,951 | 10/1983 | Barsotti | 428/328 |
| 4,490,417 | 12/1984 | Shindow et al. | 427/388.3 |
| 4,565,730 | 1/1986 | Poth et al. | 428/204 |
| 4,578,426 | 3/1986 | Lenz et al. | 525/131 |
| 4,687,813 | 8/1987 | Lenz et al. | 525/131 |
| 4,812,506 | 3/1989 | Gilmer et al. | 524/512 |
| 5,070,135 | 12/1991 | Buter | 427/388.1 |
| 5,244,959 | 9/1993 | Hazan | 524/504 |
| 5,279,862 | 1/1994 | Corcoran et al. | 427/407.1 |
| 5,322,715 | 6/1994 | Jouck et al. | 427/409 |
| 5,356,669 | 10/1994 | Rehfuss et al. | 427/407.1 |

FOREIGN PATENT DOCUMENTS 567039 10/1993 European Pat. Off. .

OTHER PUBLICATIONS

Nordstrom and Dervan, "Blocked Isocyanate Crosslinkers for Automotive Topcoats", Feb. 1993.

*Primary Examiner*—Diana Dudash
*Attorney, Agent, or Firm*—Krisanne Shideler; William J. Uhl

[57] ABSTRACT

Acid etch resistant coating compositions and their use as clear coats in color-plus-clear composite coatings is disclosed. The compositions comprise acrylic polymers prepared with high levels of cycloaliphatic ester of (meth)acrylic acid and hydroxypropyl- or hydroxybutyl(meth)acrylates and aminoplast crosslinking agents.

9 Claims, No Drawings

AMINOPLAST CURED ACID ETCH RESISTANT COATING WITH GOOD DURABILITY

FIELD OF THE INVENTION

The present invention relates to aminoplast-curable, film-forming compositions, and a process for preparing multi-layered coated articles comprising a pigmented or colored base coat and a transparent or clear topcoat.

BACKGROUND OF THE INVENTION

Color-plus-clear coating systems involving the application of a colored or pigmented base coat to a substrate followed by the application of a transparent or clear topcoat to the base coat have become conventional as original finishes for automobiles. The color-plus-clear systems have outstanding gloss and distinctness of image, and the clear coat is particularly important for these properties.

The clear coat compositions used in the automotive industry are generally one-component or two-component compositions. Currently, the automotive industry mostly utilizes one-component clear coat compositions. The most commonly used one-component compositions are aminoplast-cured.

Aminoplast-cured coatings such as polymeric polyolaminoplast systems are known to provide many excellent coating properties. They are inexpensive, durable, and attractive. However, it is widely recognized that such coatings, particularly clear coats, have poor resistance to etching by atmospheric acidic pollutants. Because many geographic areas encounter acidic precipitation, acid etch resistance in coatings is becoming an increasingly desirable property, particularly for automotive coatings. Polymeric polyol-aminoplast coating systems of the prior art are not highly effective for providing protection against etching caused by acid rain.

Two-component clear coat compositions comprising polyols such as polyester polyols, polyurethane polyols, and acrylic polyols cured with polyisocyanates yield coatings with outstanding gloss and distinctness of image. However, the isocyanates are difficult to handle. They are sensitive to moisture and require cumbersome safety precautions because of their toxicity.

Coating systems of the prior art which are known to be durable include polymers having cyclohexyl and hydroxyalkyl functionality. Examples include vinyl fluoropolymers such as those described in U.S. Pat. No. 4,345,057 and acrylic polymers such as those disclosed in U.S. Pat. No. 4,565,730. The fluoropolymers of U.S. Pat. No. 4,345,057 are the reaction products of fluoroolefin monomers, cyclohexyl vinyl ether monomers, t-alkyl vinyl ether monomers, and hydroxyalkyl vinyl ether monomers. Unfortunately, the fluoroolefin raw materials needed for these fluoropolymers are very expensive. U.S. Pat. No. 4,565,730 discloses the use of acrylic polymers which may contain cyclohexyl(meth)acrylate and/or hydroxybutyl(meth)acrylate in coating compositions. These polymers are cured with polyisocyanates in a two-component composition. The polyisocyanates are also expensive and the handling and toxicity of the isocyanates are additional drawbacks. Like the fluoropolymer coatings, the coatings of U.S. Pat. No. 4,565,730 exhibit durability, but there is no teaching that either the fluoropolymers or the polyisocyanate cured systems are resistant to acid etching.

It has been discovered, surprisingly, that acid etch resistant coatings can be prepared from polymers containing cyclohexyl (meth)acrylate and certain hydroxyalkyl(meth)acrylate which are crosslinked with aminoplast crosslinking agents. The present invention provides a color-plus-clear coating system which avoids the problems of the prior art by providing improved acid etch resistance properties using less expensive, relatively non-toxic raw materials.

SUMMARY OF THE INVENTION

In accordance with the present invention, a curable film-forming composition is provided comprising (1) about 60 to 90 percent by weight based on total resin solids of a hydroxyl-containing acrylic solution polymer; and (2) about 10 to 40 percent by weight based on total resin solids of an aminoplast crosslinking agent. The acrylic polymer is the reaction product of about 40 to about 90 percent by weight of a cycloaliphatic or aromatic ester of acrylic acid or methacrylic acid, hereinafter "(meth)acrylic acid", having at least 6 carbon atoms in the cycloaliphatic or aromatic group based on total weight of monomers used in preparing the acrylic polymer, and about 6 to about 40 percent by weight based on total weight of monomers used in preparing the acrylic polymer of a hydroxyl functional acrylic monomer such as hydroxypropyl acrylate, hydroxypropyl methacrylate, 2-hydroxybutyl acrylate, 4-hydroxybutyl acrylate, 2-hydroxybutyl methacrylate and 4-hydroxybutyl methacrylate.

Also provided in accordance with the present invention is a process for applying a composite coating to a substrate. The process comprises applying to the substrate a film-forming composition to form a base coat and applying to the base coat a film-forming composition to form a transparent topcoat over the base coat. The transparent topcoat, or clear coat, comprises the curable film-forming composition described above.

DETAILED DESCRIPTION

The film-forming composition of the present invention is a crosslinkable composition comprising (1) about 60 to 90 percent by weight, preferably 75 to 85 percent by weight based on total resin solids weight of a hydroxyl-containing acrylic solution polymer; and (2) about 10 to 40, preferably 15 to 30, percent by weight based on total resin solids weight of an aminoplast crosslinking agent.

The acrylic polymer is the reaction product of about 40 to about 90 percent by weight, preferably 60 to 90 percent by weight of a cycloaliphatic or aromatic ester of (meth)acrylic acid having at least 6, typically 6 to 12, carbon atoms in the cycloaliphatic or aromatic group such as benzyl methacrylate, phenyl methacrylate, t-butyl-cyclohexyl methacrylate and cyclohexyl methacrylate, which is preferred, based on total weight of monomers used in preparing the acrylic polymer and about 6 to about 40 percent by weight, preferably 10 to 25 percent by weight based on total weight of monomer used in preparing the acrylic polymer of a hydroxyl functional acrylic monomer such as hydroxypropyl acrylate, hydroxypropyl methacrylate, 2- and 4-hydroxybutyl acrylate, and methacrylate. Hydroxybutyl acrylate is the preferred hydroxyl functional acrylic monomer; 2-hydroxybutyl acrylate is most preferred for acid etch resistance.

The acrylic polymer may further include up to 25 percent by weight based on total weight of monomers used in preparing the acrylic polymer of a monomer selected from vinyl aromatic compounds and alkyl acrylates and methacrylates containing from one to eight carbon atoms in the alkyl group. Suitable vinyl aromatic compounds include, for example, styrene and vinyl toluene. Styrene is preferred. Suitable alkyl acrylates and methacrylates include methyl methacrylate, ethyl methacrylate, n-butyl methacrylate, ethyl acrylate, n-butyl acrylate, and 2-ethylhexyl acrylate. n-Butyl methacrylate is preferred.

By acrylic solution polymer is meant the acrylic polymer is prepared by solution polymerization techniques in the presence of suitable initiators such as organic peroxides or azo compounds, for example, benzoyl peroxide or 2,2'-azobis(2-methylbutanenitrile). The polymerization may be carried out in an organic solvent in which the monomers are soluble by techniques conventional in the art. Solution polymerization yields a clear polymeric solution, in contrast to a nonaqueous dispersion, which is opaque.

The acrylic polymer typically has a number average molecular weight of from about 1000 to 30,000, preferably from about 1500 to 20,000 as determined by gel permeation chromatography using polystyrene as a standard.

The coating composition also includes an aminoplast crosslinking agent containing methylol and/or methylol ether groups. Aminoplast condensates are obtained from the reaction of formaldehyde with an amine or amide. The most common amines or amides are melamine, urea, or benzoguanamine, and are preferred. However, condensates with other amines or amides can be used; for example, aldehyde condensates of glycoluril are suitable. They yield a high melting crystalline product which is useful in powder coatings. While the aldehyde used is most often formaldehyde, other aldehydes such as acetaldehyde, crotonaldehyde, and benzaldehyde may be used.

The aminoplast contains methylol groups and preferably at least a portion of these groups are etherified with an alcohol to modify the cure response. Any monohydric alcohol may be employed for this purpose including methanol, ethanol, butanol, and hexanol.

Preferably, the aminoplasts which are used are melamine-, urea-, or benzoguanamine-formaldehyde condensates partially etherified and polymeric, more preferably, imino content such as CYMEL 327 from CYTEC Industries. The aminoplast is present in amounts of about 10 to 40, preferably 15 to 30 percent by weight based on weight of resin solids in the film-forming composition.

The coating composition of the present invention is preferably used as the clear coat layer in a "color-plus-clear" coating system. The clear film-forming composition will preferably contain catalysts to accelerate the cure of the aminoplast and crosslinkable groups. Examples of suitable catalysts are acidic materials and include sulfonic acid or a substituted sulfonic acid such as paratoluene sulfonic acid. The catalyst is usually present in an amount of about 0.5 to 5.0 percent by weight, preferably about 0.5 to 2 percent by weight, based on weight of total resin solids. Optional ingredients such as, for example, plasticizers, flow controllers, antioxidants, UV light absorbers and similar additives conventional in the art may be included in the composition. These ingredients are typically present at up to 25% by weight based on total resin solids.

The film-forming composition of the base coat in the color-plus-clear system can be any of the compositions useful in coatings applications, particularly automotive applications. The film-forming composition of the base coat comprises a resinous binder and a pigment to act as the colorant. Particularly useful resinous binders are acrylic polymers, polyesters (including alkyds) and polyurethanes.

The base coat compositions may be solventborne or waterborne. Waterborne base coats in color-plus-clear compositions are disclosed in U.S. Pat. No. 4,403,003, and the resinous compositions used in preparing these base coats can be used in the practice of this invention. Also, waterborne polyurethanes such as those prepared in accordance with U.S. Pat. No. 4,147,679 can be used as the resinous binder in the base coat. Further, waterborne coatings such as those described in U.S. Pat. No. 5,071,904 can be used as the base coat.

The base coat also contains pigments to give it color. Compositions containing metallic flake pigmentation are useful for the production of so-called "glamour metallic" finishes chiefly upon the surface of automobile bodies. Suitable metallic pigments include in particular aluminum flake, copper bronze flake and metal oxide coated mica.

Besides the metallic pigments, the base coating compositions of the present invention may contain non-metallic color pigments conventionally used in surface coatings including inorganic pigments such as titanium dioxide, iron oxide, chromium oxide, lead chromate, and carbon black, and organic pigments such as phthalocyanine blue and phthalocyanine green. In general, the pigment is incorporated into the coating composition in amounts of about 1 to 80 percent by weight based on weight of coating solids. The metallic pigment is employed in amounts of about 0.5 to 25 percent by weight based on weight of coating solids.

If desired, the base coat composition may contain additional materials well known in the art of formulated surface coatings. These would include surfactants, flow control agents, thixotropic agents, fillers, anti-gassing agents, organic cosolvents, catalysts, and other customary auxiliaries. These materials can constitute up to 40 percent by weight of the total weight of the coating composition.

The base coating compositions can be applied to various substrates to which they adhere. The compositions can be applied by conventional means including brushing, dipping, flow coating, spraying and the like, but they are most often applied by spraying. The usual spray techniques and equipment for air spraying and electrostatic spraying and either manual or automatic methods can be used.

Coatings of the present invention can be applied over virtually any substrate including wood, metals, glass, cloth, plastic, foam, including elastomeric substrates and the like. They are particularly useful in applying over metals and elastomeric substrates that are found on motor vehicles.

During application of the base coat composition to the substrate, a film of the base coat is formed on the substrate. Typically, the base coat thickness will be about 0.01 to 5, preferably 0.1 to 2 mils in thickness.

After application of the base coat to the substrate, a film is formed on the surface of the substrate by driving solvent, i.e., organic solvent or water, out of the base coat film by heating or by an air drying period. Preferably, the heating will only be for a short period of time, sufficient to ensure that the clear coat can be applied to the base coat without the former dissolving the base coat composition. Suitable drying conditions will depend on the particular base coat composition, and on the ambient humidity with certain waterborne compositions, but in general a drying time of from about 1 to 5 minutes at a temperature of about 68°–250° F. (20°–121° C.) will be adequate to ensure that mixing, or "soak-in" of the two coats is minimized. At the same time, the base coat film is adequately wetted by the clear coat composition so that satisfactory intercoat adhesion is obtained. Also, more than one base coat and multiple top coats may be applied to develop the optimum appearance. Usually between coats, the previously applied coat is flashed; that is, exposed to ambient conditions for about 1 to 20 minutes.

The clear coat composition may be applied to the base coated substrate by any conventional coating technique such as brushing, spraying, dipping or flowing, but spray applications are preferred because of superior gloss and uniform film thickness. Any of the known spraying techniques may be employed such as compressed air spraying, electrostatic spraying and either manual or automatic methods.

After application of the clear coat composition to the base coat, the coated substrate is heated to cure the coating layers. In the curing operation, solvents are driven off and the film-forming materials of the clear coat and the base coat are each crosslinked. The heating or curing operation is usually carried out at a temperature in the range of from 160°–350° F. (71°–177° C.) but if needed, lower or higher temperatures may be used as necessary to activate crosslinking mechanisms. The thickness of the clear coat is usually from about 0.5–5, preferably 1.2–3 mils.

The invention will further be described by reference to the following examples. Unless otherwise indicated, all parts are by weight.

EXAMPLES

The following examples (1–12) are the free radical initiated addition polymers used in the practice of the invention.

Example 1

The following initial charge and feeds were used in the preparation of cyclohexyl methacrylate-containing acrylic resin by solution polymerization technique in xylene.

| | Ingredients | Parts by Weight |
|---|---|---|
| Initial Charge | Xylene | 540.0 |

-continued

| | Ingredients | Parts by Weight |
|---|---|---|
| Feed A | Cyclohexyl methacrylate | 1559.4 |
| | 2-Hydroxybutyl acrylate | 240.6 |
| Feed B | VAZO-67[1] | 90.0 |
| | Xylene | 540.0 |

The initial charge was heated in a reaction vessel with agitation to reflux temperature (141° C.). At reflux Feeds A and B were initiated simultaneously and continued in a substantially continuous manner over a period of 3 hours while maintaining the reaction mixture at reflux temperature. At the completion of Feeds A and B, the reaction mixture was held for 3 hours at reflux temperature to complete the polymerization. The reaction mixture was cooled and filtered. The resultant acrylic resin had a total solids content of 60.9 percent determined at 110° C. for one hour and number average molecular weight ($M_n$) of 1866 as determined by gel permeation chromatography (GPC) using polystyrene as a standard. The resin had a Gardner-Holdt viscosity measured at 25° C. of M.

Examples 2–12

The free radical addition polymers containing various amount of cyclohexyl methacrylate and hydroxyl functional monomers were prepared similar to Example 1 and their composition, solids content, viscosity and number average molecular weight are tabulated in Table I.

TABLE I

| Ingred. | 1 | 2 | 3 | 4 | 5 | 6 | 7 | 8 | 9 | 10 | 11 | 12 |
|---|---|---|---|---|---|---|---|---|---|---|---|---|
| CHMA[1] | 86.6 | 75.0 | 87.9 | 75.0 | 90.0 | 92.0 | 93.3 | 60.0 | 71.7 | 41.7 | 26.7 | 75.0 |
| 2-HBA[2] | 13.4 | 25.0 | — | — | — | — | 6.7 | 40.0 | 13.3 | 13.3 | 13.3 | — |
| HPA[3] | — | — | 12.1 | 25.0 | 10.0 | 8.0 | — | — | — | — | — | — |
| 4-HBA[4] | — | — | — | — | — | — | — | — | — | — | — | 25.0 |
| BA[5] | — | — | — | — | — | — | — | — | 15.0 | 45.0 | 60.0 | — |
| VAZO-67 | 5.0 | 5.0 | 5.0 | 5.0 | 5.0 | 5.0 | 5.0 | 5.0 | 5.0 | 5.0 | 5.0 | 5.0 |
| % SOLIDS | 60.9 | 60.6 | 62.3 | 60.5 | 61.1 | 62.4 | 60.7 | 59.5 | 60.9 | 61.3 | 58.9 | 62.6 |
| VISCOSITY | M | N | T | W | R— | U— | T | — | G | F+ | A— | — |
| Mn | 1866 | 2379 | 1910 | 2330 | 2737 | 2197 | 2299 | — | 2043 | 2540 | 2098 | — |

[1]cyclohexyl methacrylate
[2]2-hydroxybutyl acrylate
[3]hydroxypropyl acrylate
[4]4-hydroxybutyl acrylate
[5]n-butyl acrylate

Example 13

A pigmented black base coating composition was used which is available from PPG Industries Inc. as POLYCRON ®II.

Example 14

A pigmented black automotive base coating composition was used which is available from PPG Industries Inc. as NHU 9517.

Example I

A clear film forming composition was formulated from the following ingredients:

| Ingredients | Parts by Weight (grams) | Solids (grams) |
|---|---|---|
| Acrylic resin of Example 1 | 266.7 | 162.4 |
| CYMEL 303[1] | 28.7 | 28.7 |
| Xylene | 14.6 | 0 |
| n-Butyl acetate | 14.6 | 0 |
| n-Butanol | 7.3 | 0 |

-continued

| Ingredients | Parts by Weight (grams) | Solids (grams) |
|---|---|---|
| TINUVIN 328[2] | 15.3 | 4.6 |
| TINUVIN 292[3] | 1.9 | 1.0 |
| CYCAT-4040[4] | 2.4 | 1.0 |

[1]Hexamethoxymethyl melamine available from CYTEC Industries.
[2]2-(2'-Hydroxy-3',5'-ditert-amylphenyl) benzotriazole UV light stabilizer available from Ciba-Geigy Corp., dissolved in xylene.
[3]Bis(1,2,2,6,6-pentamethyl-4-piperidinyl) sebacate hindered amine stabilizer available from Ciba-Geigy Corp., neutralized with dodecylbenzene sulfonic acid and diluted with isobutanol.
[4]40 percent solution of paratoluene sulfonic acid in isopropanol available from CYTEC Industries.

The resultant formulated coating composition was reduced to a No. 2 Zahn cup viscosity of 21 seconds with a 40/40/20 blend of xylene/DOWANOL PM acetate/n-butanol for application. DOWANOL PM acetate is methyl ether propylene glycol acetate commercially available from Dow Chemical Co.

Examples II–XI

The clear coating compositions containing copolymers of cyclohexyl methacrylate and hydroxyl functional monomers were formulated similar to Example I and their compositions are tabulated in Table II.

VESSO 100 is an aromatic hydrocarbon commercially available from Exxon Chemical Co.

The base coating composition prepared according to Example 13 was air-atomized spray applied to pretreated aluminum panels at room temperature to attain a dry film thickness of 0.6 to 1.0 mils. After a 10 minute flash, the panels were then baked for 10 minutes at 350° F. The panels were allowed to cool to room temperature and the prepared clear coating compositions were applied to the base coating. The clear coatings of Examples I to XI and comparative Example XII were applied in four successive coats at room temperature with films ranging from 1.8 to 2.2 mils. Each panel was given a 10 minute flash at room temperature, 10 minute "force" flash at 150° F., and then baked for 30 minutes at 285° F.

The films were then evaluated for acid etch resistance via a 3-cycle sulfurous acid spray test. The acid solution with pH=2 was prepared by adding 12 grams of $H_2SO_3$ to 350 grams of deionized water. The test consists of misting 3"×5" panel sections with the acid solution to completely cover the panels densely with droplets and then placing the panels in a 120° F. oven for 20 minutes. This constitutes one cycle. The procedure is then repeated two times. The panels are then washed with soap and water and towel dried for evaluation. The acid etch results are reported in Table II.

TABLE II

| Ingred. | I | II | III | IV | V | VI | VII | VIII | IX | X | XI | XII |
|---|---|---|---|---|---|---|---|---|---|---|---|---|
| CYMEL 303 | 15 | 25 | 35 | 15 | 15 | — | — | 15 | 15 | 15 | 15 | — |
| CYMEL 327[1] | — | — | — | — | — | 15 | — | — | — | — | — | — |
| RESIMENE 755[2] | — | — | — | — | — | — | 15 | — | — | — | — | — |
| RESIN FR. EX. 1 | 85 | 75 | 65 | — | — | — | — | — | — | — | — | — |
| RESIN FR. EX. 2 | — | — | — | 85 | — | — | — | — | — | — | — | — |
| RESIN FR. EX. 3 | — | — | — | — | 85 | 85 | 85 | — | — | — | — | — |
| RESIN FR. EX. 4 | — | — | — | — | — | — | — | 85 | — | — | — | — |
| RESIN FR. EX. 5 | — | — | — | — | — | — | — | — | 85 | — | — | — |
| RESIN FR. EX. 6 | — | — | — | — | — | — | — | — | — | 85 | — | — |
| RESIN FR. EX. 7 | — | — | — | — | — | — | — | — | — | — | 85 | — |
| TINUVIN 328 | 2.4 | 2.4 | 2.4 | 2.4 | 2.4 | 2.4 | 2.4 | 2.4 | 2.4 | 2.4 | 2.4 | — |
| TINUVIN 292 | 0.5 | 0.5 | 0.5 | 0.5 | 0.5 | 0.5 | 0.5 | 0.5 | 0.5 | 0.5 | 0.5 | — |
| CYCAT 4040 | 0.5 | 0.5 | 0.5 | 0.5 | 0.5 | 0.5 | 0.5 | 0.5 | 0.5 | 0.5 | 0.5 | — |
| ACID ETCH[3] | 3 | 4 | 8 | 5 | 5 | 3 | 3 | 7 | 2 | 2 | 1 | 9 |
| PENCIL HARDNESS | H | H | H | H | H | HB | H | H | H | H | H | H |
| 60° GLOSS[4] | 92 | 93 | 95 | 91 | 91 | 92 | 92 | 90 | 92 | 92 | 93 | 96 |
| MEK[5] | P | P | P | P | P | P | P | P | P | P | P | P |

[1]Partially methylated melamine formaldehyde condensate with imino content in isobutanol available from CYTEC Industries.
[2]Hexaalkoxymethyl melamine of mixed methoxy/butoxy (1:1) functionalities available from Monsanto Chemical Co.
[3]Rating: 0 = no etch; 10 = severe etch
[4]Measured with a 60° glossmeter, GLOSSGARD ™ RII available from Pacific Scientific.
[5]100 methyl ethyl ketone double rubs; P = pass Comparative Example XII A comparative clear coating composition containing aminoplast and polyol was used which is available from PPG Industries Inc. as DCT 3000. The polyol dissolved in isobutanol, xylene and SOLVESSO 100 (10:45:45 weight ratio) prepared from 40 percent hydroxypropyl acrylate, 20 percent styrene, 19 percent n-butyl acrylate, 18.5 percent n-butyl methacrylate, 2 percent acrylic acid and 0.5 percent methyl methacrylate. SOL- Example XIII The following ingredients were used to formulate a clear film forming coating:

| Ingredients | Parts by Weight (grams) | Solids (grams) |
|---|---|---|
| Ethyl-3-ethoxy propionate | 19.0 | 0 |
| n-Propyl alcohol | 5.0 | 0 |

-continued then washed with soap and water and towel dried for evaluation. The results are reported in Table III.

TABLE III

| Ingred. | XIII | XIV | XV | XVI | XVII | XVIII | XIX | XX | XXI | XXII |
|---|---|---|---|---|---|---|---|---|---|---|
| CYMEL 327 | 15 | 30 | 40 | 15 | 15 | 30 | 30 | 30 | 30 | 30 |
| RESIN FR. EX. 1 | 85 | 70 | 60 | — | — | — | — | — | — | — |
| RESIN FR. EX. 2 | — | — | — | — | — | — | — | — | 70 | — |
| RESIN FR. EX. 3 | — | — | — | 85 | — | — | — | — | — | — |
| RESIN FR. EX. 8 | — | — | — | — | 85 | — | — | — | — | — |
| RESIN FR. EX. 9 | — | — | — | — | — | 70 | — | — | — | — |
| RESIN FR. EX. 10 | — | — | — | — | — | — | 70 | — | — | — |
| RESIN FR. EX. 11 | — | — | — | — | — | — | — | 70 | — | — |
| RESIN FR. EX. 12 | — | — | — | — | — | — | — | — | — | 70 |
| TINUVIN 328 | 3.0 | 3.0 | 3.0 | 3.0 | 3.0 | 3.0 | 3.0 | 3.0 | 3.0 | 3.0 |
| TINUVIN 292 | 0.3 | 0.3 | 0.3 | 0.3 | 0.3 | 0.3 | 0.3 | 0.3 | 0.3 | 0.3 |
| FLOW ADDITIVE[1] | 0.4 | 0.4 | 0.4 | 0.4 | 0.4 | 0.4 | 0.4 | 0.4 | 0.4 | 0.4 |
| CATALYST[2] | 1.0 | 1.0 | 1.0 | 1.0 | 1.0 | 1.0 | 1.0 | 1.0 | 1.0 | 1.0 |
| ACID EtaH | 1 | 2–3 | 4 | 2 | 8 | 4–5 | 7–8 | 10 | 1 | 1–2 |
| 20° GLOSS[3] | 90 | 89 | 91 | 88 | 89 | 86 | 89 | 86 | 89 | 89 |
| DOI[4] | 43 | 72 | 66 | 64 | 89 | 77 | 83 | 78 | 94 | 95 |

[1] Poly(n-butylacrylate) in xylene available from E. I. du Pont de Nemours and Co.
[2] Mixture of phenyl dihydrogen phosphate and diphenyl monohydrogen phosphate in butanol available from Albright and Wilson Inc.
[3] Measured with a 200 glossmeter available from Gardner Instrument Co.
[4] Distinctness of Image determined by DORI-GON meter D-47-6 manufactured by Hunter Laboratories.

| Ingredients | Parts by Weight (grams) | Solids (grams) |
|---|---|---|
| TINUVIN 328 | 3.0 | 3.0 |
| TINUVIN 292 | 0.3 | 0.3 |
| Flow additive[1] | 0.7 | 0.4 |
| CYMEL 327 | 16.7 | 15.0 |
| Acrylic resin according to Example 1 | 146.8 | 85.0 |
| Catalyst[2] | 1.3 | 1.0 |

[1] Poly(n-butyl acrylate) in xylene available from E. I. du Pont de Nemours and Co.
[2] Mixture of phenyl dihydrogen phosphate and diphenyl monohydrogen phosphate in butanol available from Albright and Wilson Inc.

The resultant formulated coating composition was reduced to a No. 4 Ford cup viscosity of 20 seconds with ethyl-3-ethoxy propionate for application.

Examples XIV–XXII

The clear coating compositions containing copolymers of cyclohexyl methacrylate and hydroxyl functional monomers were formulated similar to Example XIII and their compositions are tabulated in Table III.

The coatings were applied at room temperature. The base coat prepared according to Example 14 was spray applied to attain a dry film thickness of 0.8 to 1.0 mils. After a 5 to 10 minute flash at room temperature, the clear coatings of comparative Example XII and Examples XIII to XXII were spray applied with film thickness ranging from 1.8 to 2.2 mils. Each panel was given a 15 minute flash at room temperature and then baked for 30 minutes at 285° F.

The films were than evaluated for acid etch resistance via a two-cycle sulfurous acid spray test. The acid solution with pH=2 was prepared by adding 12 grams of $H_2SO_3$ to 350 grams of deionized water. The test consists of misting 3"×5" panel sections with acid solution to completely cover the panels densely with droplets and then placing the panels in a 110° F. oven for 30 minutes. This constitutes one cycle. The procedure is then repeated to have total two cycles. The panels are

We claim:

1. A method for applying a composite coating to a substrate which comprises applying to the substrate a colored film-forming composition to form a base coat and applying to said base coat a clear curable film-forming composition to form a transparent clear coat over the base coat characterized in that the clear curable film-forming composition comprises (1) about 70 to 85 percent by weight based on total resin solids weight of a hydroxyl-containing acrylic solution polymer which is the reaction product of about 40 to about 90 percent by weight of a cycloaliphatic ester of (meth)acrylic acid selected from the group consisting of cyclohexyl methacrylate and t-butyl-cyclohexyl methacrylate based on total weight of monomers used in preparing the hydroxyl-containing acrylic solution polymer and about 6 to about 25 percent by weight, based on total weight of monomers used in preparing the hydroxyl-containing acrylic solution polymer, of a hydroxyl functional acrylic monomer selected from the group consisting of hydroxypropyl acrylate, hydroxypropyl methacrylate, 2-hydroxybutyl acrylate, 4-hydroxybutyl acrylate, 2-hydroxybutyl methacrylate, and 4-hydroxybutyl methacrylate; and (2) about 15 to 30 percent by weight based on total resin solids weight of an aminoplast crosslinking agent.

2. The method of claim 1 in which the acrylic solution polymer has a hydroxyl monomer content of about 10 percent to about 25 percent by weight, based on total weight of the monomers used in preparing the acrylic polymer.

3. The method of claim 1 in which the acrylic solution polymer further includes up to 25 percent by weight based on total weight of monomers used in preparing the acrylic polymer of a monomer selected from the group consisting of vinyl aromatic compounds and alkyl acrylates and methacrylates containing from one to eight carbon atoms in the alkyl group.

4. The method of claim 3 in which said alkyl methacrylate is n-butyl methacrylate.

5. The method of claim 1 in which said hydroxyl functional acrylic monomer is 2-hydroxybutyl acrylate.

6. The method of claim 1 in which the acrylic polymer has a number average molecular weight of 1500 to 20,000.

7. The method of claim 1 in which the aminoplast crosslinking agent is a partially etherified, polymeric, imino-containing melamine-formaldehyde condensate.

8. The method of claim 1 in which the cycloaliphatic ester of (meth)acrylic acid is cyclohexyl methacrylate.

9. A method for applying a composite coating to a substrate which comprises applying to the substrate a colored film-forming composition to form a base coat and applying to said base coat a clear curable film-forming composition to form a transparent top coat over the base coat characterized in that the clear curable film-forming composition comprises (1) about 60 to 90 percent by weight based on total resin solids weight of a hydroxyl-containing acrylic solution polymer which is the reaction product of about 40 to about 90 percent by weight of a cycloaliphatic ester of (meth)acrylic acid selected from the group consisting of cyclohexyl methacrylate and t-butyl-cyclohexyl methacrylate, based on total weight of monomers used in preparing the hydroxyl-containing acrylic solution polymer and about 6 to about 25 percent by weight, based on total weight of monomers used in preparing the hydroxyl-containing acrylic solution polymer, of a hydroxyl functional acrylic monomer selected from the group consisting of hydroxypropyl acrylate, hydroxypropyl methacrylate, 2-hydroxybutyl acrylate, 4-hydroxybutyl acrylate, 2-hydroxybutyl methacrylate, and 4-hydroxybutyl methacrylate; and (2) about 10 to 40 percent by weight based on total resin solids weight of a partially etherified, polymeric, imino-containing reelamine-formaldehyde condensate.

* * * * *

UNITED STATES PATENT AND TRADEMARK OFFICE
CERTIFICATE OF CORRECTION

PATENT NO. : 5,445,850
DATED : August 29, 1995
INVENTOR(S) : Suryya K. Das, Soner Kilic, Michael A. Mayo and Andrew J. Lauer It is certified that error appears in the above-identified patent and that said Letters Patent is hereby corrected as shown below:

Claim 9, column 12, line 17, delete "reelamine-formaldehyde" and insert --melamine-formaldehyde--.

Signed and Sealed this

Sixth Day of January, 1998

*Attest:*

*Attesting Officer*

BRUCE LEHMAN
*Commissioner of Patents and Trademarks*